United States Patent [19]
Smith

[11] Patent Number: 6,067,813
[45] Date of Patent: *May 30, 2000

[54] MODULAR BEVERAGE COOLER SYSTEM

[76] Inventor: Ronald W. Smith, 4039 W. Sharon Ave., Phoenix, Ariz. 85029

[*] Notice: This patent is subject to a terminal disclaimer.

[21] Appl. No.: 09/088,387

[22] Filed: Jun. 1, 1998

Related U.S. Application Data

[63] Continuation-in-part of application No. 08/697,531, Aug. 26, 1996, Pat. No. 5,758,513.

[51] Int. Cl.⁷ ...................................................... F25D 3/08
[52] U.S. Cl. .......................... 62/371; 62/457.4; 62/475.5; 62/530
[58] Field of Search ................................ 62/457.4, 475.5, 62/530, 371

[56] References Cited

U.S. PATENT DOCUMENTS

| | | | |
|---|---|---|---|
| 4,281,520 | 8/1981 | Norwood | 62/372 |
| 5,095,718 | 3/1992 | Ormond et al. | 62/457.5 |
| 5,758,513 | 6/1998 | Smith | 62/457.5 |

*Primary Examiner*—Henry Bennett
*Assistant Examiner*—Mark Shulman
*Attorney, Agent, or Firm*—Gregory J. Nelson

[57] ABSTRACT

A portable modular cooler system for beverages which includes one or more bottles containing a freezable coolant refrigerant. The bottles define recesses for receiving the housed beverage containers. An insulated casing extends about the bottle to maintain and contain containers in a cooled condition for an extended period of time. The bottles and casing are inserted into a carrying case for convenience of the user. The case may have exterior pockets specially configured and located for specific sport and recreational activities. The carrying case, bottles and insulative casing may be configured so that the cooler may be comfortably carried by the user in a manner similar to a "fanny pack". In other embodiments, the bottles containing the refrigerant are identical one to the other and are positioned in face-to-face relationship to form a plurality of cooling chambers. The cooler may also be placed in another article for transportation such as within the large side pocket of a golf bag. The modular system allows the user to assemble a cooler of the desired capacity by assembling the selecting bottle, liner and case components.

10 Claims, 5 Drawing Sheets

MODULAR BEVERAGE COOLER SYSTEM

This application is a continuation-in-part of application Ser. No. 08/697,531, filed Aug. 26, 1996 titled "Insulated Beverage Cooler System", now U.S. Pat. No. 5,758,513, issued Jun. 2, 1998.

FIELD OF THE INVENTION

The present invention relates to a compact, modular cooler system for canned and bottled beverages and more particularly relates to a system having, as a component, a cooling element termed a "bottle" in which the containers to be cooled are inserted. The system also includes a polymeric foam casing extending about the bottle, a removable foam cover and an exterior member such as a carrying case which retains the cooler components together. The cooler system is modular permitting the user to remove, select and interchange components as required to facilitate cleaning, replacement and to accommodate the capacity required by the user.

BACKGROUND OF THE INVENTION

A wide variety of portable coolers for maintaining beverages in a chilled condition are known. Portable coolers, which are non-electric relying on a previously frozen or chilled medium, are generally effective and are widely used. Nevertheless, there are problems associated with their use including accessibility to stored containers, bulky cooler design, ineffective insulation, difficulty in cleaning and lack of convenience.

The following patents are representative of the general art of insulated beverage containers.

U.S. Pat. No. 4,620,426 shows an insulated beverage container having an outer casing with an interior foam housing. The foam housing is shaped to accommodate at least two conventional beverage containers. Containers of the Blue Ice cold pack type are located above the beverage cans.

U.S. Pat. No. 4,441,336 shows a portable cooler having a lid and a food compartment. A bottle is filled with water and is frozen. The bottle has opposed, corrugated surfaces with concavities which contact the contained beverages.

U.S. Pat. No. 4,295,345 discloses a reusable container for carrying and cooling beverages defining a plurality of cylindrical compartments. The top section includes a slow-warming, cooling gel.

U.S. Pat. No. 4,266,407 discloses a portable cooler having two molded insulating storage container sections having matching recesses for receiving beverage containers. The sections close over the containers to bring a frozen, removable cold pack into contact with the container. The molded storage containers can be inserted within the pocket of a fabric carrier so that the unit can be hand-held or carried on a belt.

U.S. Pat. No. 4,747,274 shows a device for cooling beverage containers which has a cooling element in the form of a block or plate-shaped hollow body that is filled with a cooling media.

U.S. Pat. No. 5,007,250 shows a portable insulated cooling container. The cooling container has a canvas body with an insulating mat of foam or other material on the interior sides of the fabric housing. A coolant material is contained in a hollow, sealed case that encloses a refrigerant such as Blue Ice, the case being scalloped to receive the cans. The coolant material is refrigerated prior to being placed into the compartment of the container.

My prior patent, U.S. Pat. No. 5,758,513, describes a modular beverage cooling system having at least two bottles in positionally joined relationship enclosed in an exterior case and provides significant advantages of convenience and modularity.

OBJECTS OF THE INVENTION

It is a broad object of the present invention to provide an insulated, portable cooling system for canned and bottled liquids and beverages having at least three components including one or more reusable bottles which contain a freezable or reusable ice substitute which form a compartment for receiving cans or bottles to be cooled; a removable insulative foam cover; and a carrying case.

Another object of the present invention is to provide a beverage cooler system having as modular components, reusable bottles, an insulative foam casing and an exterior carrying case which, when assembled into a cooler, can be hand carried or worn around the waist of the user. The modular configuration permits the user to selectively assemble these components into a cooler of the desired configuration.

Another object of the present invention is to provide an insulated cooling container for beverages which has a bottle containing a freezable liquid, an insulated container and an exterior case which unit is adapted to be inserted into the pocket of a carried object such as the pocket of a golf bag.

SUMMARY OF THE INVENTION

The present invention, in the various preferred embodiments disclosed herein, provides a unique beverage cooler system that accomplishes the foregoing objects and which has an outer soft fabric case having a suitable closure such as a fastener, zipper, elastic band or drawstring. The case may have a shoulder strap or may have a strap for attachment around the waist of the wearer. Within the fabric case is insulation which is in the form of a removable casing about the cooling bottles and contained beverages and preferably is a cross-linked polymeric foam material. A removable insulative foam cover also of polymeric foam extends over the top of the bottle and containers. The casing and cover are removable to accommodate washing and cleaning.

The cooling bottles, which may consist of either one or several mating components, are housed within the insulation casing. The bottles are reusable and contain a refrigerant or coolant that may be frozen or chilled prior to use. The bottle assembly has one or more recesses in which the beverage containers are received or nest. The modular components may be assembled in a compact personal cooler containing a single bottle or assembled in a larger cooler assembly having multiple bottles for increased capacity. For example, the foam cover, casing and bottle may be assembled in three, six or twelve pack configurations. The carrying case may be provided with exterior pockets and attachments for accessories specific to a certain activity such as picnics, racing events, fishing and other recreational events where various items may be conveniently stored for use.

In another embodiment, the cooler has an exterior case without a lid. The case secures the insulation casing about the bottle or bottles and is designed so the cooler is adapted to be placed in the pocket of another object, such as the large side or shoe pocket of a golf bag.

The above as well as other objects and advantages of the present invention will become apparent from the following detailed description of the preferred embodiments taken in conjunction with the accompanying drawings in which:

DETAILED DESCRIPTION OF THE DRAWINGS

Turning now to the drawings, FIGS. 1 through 4 illustrate a cooler according to a preferred embodiment of the present invention which is generally designated by the numeral 10. The cooler system has three basic components which will be described in detail and which include an outer carrying case 12, an insulative casing 14 and an interior bottle 16. The term "bottle" is a term of art which refers to the coolant-containing member which is frozen or chilled and which may be re-used.

The bottle 16 has a generally planar outer wall 18 and an inner surface which defines three adjacent vertically extending generally semi-cylindrical concavities 20, 22 and 24. The construction of the bottle is completed by a top surface 25 and a lower surface 26. The bottle is hollow and is preferably formed as by blow molding by a suitable plastic material such as polyethylene and contains a suitable coolant or refrigerant which may be water but is preferably a mixture such as water and glycerin or the refrigerant such as is sold under the trademark Blue Ice. The bottle is placed in a freezer or refrigerator to be chilled or the contents frozen prior to being placed in use in the cooler and is reusable.

The vertical height "H" of the bottle is slightly less than the height of conventional beverage cans such as conventional 12 oz. soft drink or malt beverage containers "C". Typically, "H" is about ½" less than the height of a typical beverage container. This dimensional difference allows for convenient accessibility so the user can grasp the protruding edge of the container. The recesses 20, 22 and 24 conform to the curvature of the exterior of beverage containers of this type. In use, beverage containers are placed in the recesses in nesting engagement with the bottle 16 so that the containers and their contents are cooled as a result of the contact with the refrigerated or chilled bottle. The bottle containing the beverage containers to be cooled is received within the insulative casing 14.

Figures 2, 3:
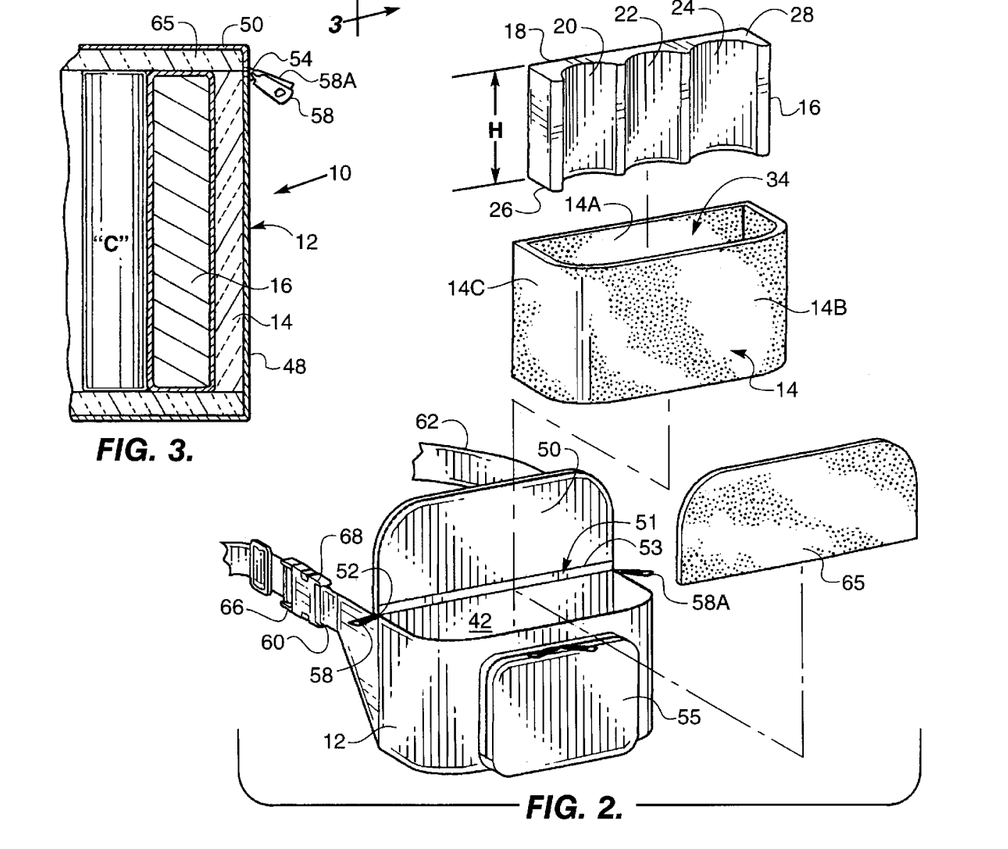
FIG. 2 is an exploded view of the cooler shown in FIG. 1.
FIG. 3 is a detailed sectional view taken along line 3—3 of FIG. 1.

The casing 14 is fabricated from a suitable insulative material such as a cross-linked polyethylene expanded foam. The casing 14 is shown as having a continuous exterior shell with a rear planar wall 14A and a front wall 14B which together with the opposite ends 14C, which are slightly rounded, establish the general shape as best seen in FIG. 2. The casing defines a compartment 34 which snugly receives the bottle 16 and any contained or housed beverage containers. The insulative casing 14 has a height approximately corresponding to or slightly greater than the height of the bottle 16. The insulative casing also serves to assist in retaining the cans within the arcuate recesses 20, 22 and 24 of the bottle.

In use, the bottle and insulative casing are received within the interior compartment 42 of the exterior case 12. The case 12 is preferably of soft sided construction having a shell 48 of a suitable material such as a water-resistant fabric with vinyl coated polyester fabric being preferred. The shell 48 has a configuration generally conforming to the configuration of the insulative casing 14 and is slightly larger providing clearance so that the casing, bottle and beverage containers can be easily placed within the compartment 42. The height of the case 12 is also selected to accommodate the components 14 and 16.

Figure 1:
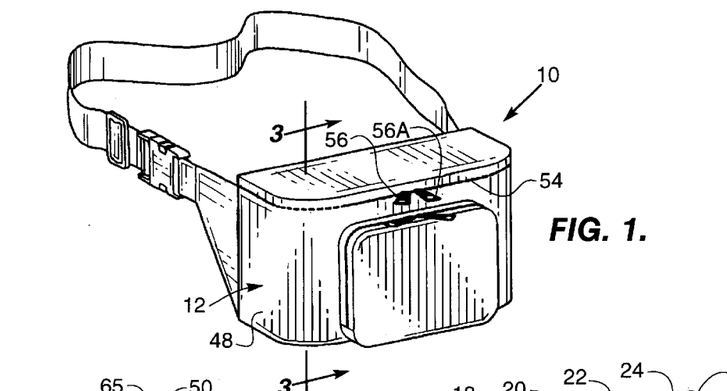
FIG. 1 is a perspective view of an embodiment of the cooler of the present invention which uses a single bottle to store three beverage containers.

A cover 50 is attached to the rear of the case at hinge section 52 and is shown in the open position in FIG. 2. In the closed position, the cover may be secured to the body of the case by a suitable closure which is shown as a zipper 54 having a pair of slides 56 and 56A each having associated tabs 58 and 58A permitting the cover to be closed by moving the slides to a central position as shown in FIG. 1. Alternatively, other types of closure devices such as well known fabric fasteners of the loop and hook type such as those sold under the trademark Velcro® may be used. A pocket 55 is shown on the front of the case 12. Accessory pockets such as 55 may be variously sized and positioned to accommodate various items and, accordingly, the user may select a case 12 designed in accordance with a particular recreational or sporting activity. For example, an auto racing fan would prefer pocket 55 be sized to contain an item such as a scanner. A picnic user would prefer several larger exterior pockets for food items.

The embodiment of the cooler shown in FIGS. 1 to 14 is a personal cooler adapted to be carried by a user or worn by the user similar to devices which are commonly termed "fanny packs" worn about the waist. A pair of opposite straps 60 and 62, which may be nylon, leather or other suitable fabric material, extend oppositely from tabs 64 at opposite sides of the outer case or bag 12. The straps may be adjustable in length and extend to the front of the body of the user where they may be joined by male and female buckle components 66 and 68.

Figure 4:
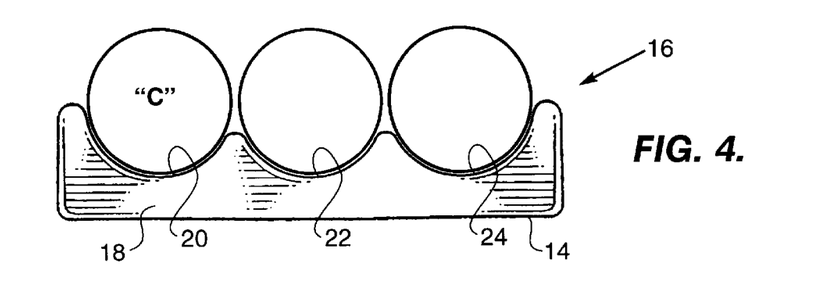
FIG. 4 is a top view of the bottle portion of the cooler of FIG. 1 showing beverage containers nested within the bottle, the beverage containers being shown in dotted lines.

To use the container, the outer carrying case 12 is opened at zipper 54 by means of the zipper slides 56 and 56A. The bottle 16 is removed from its position within the insulative casing and placed in a cold environment such as the freezer section of a refrigerator. The bottle is left for a sufficient period of time so as to freeze the coolant or refrigerant contained within the bottle. The bottle is then replaced within the insulative casing 14. From one to three beverage containers "C" can then be inserted within the arcuate recesses 20, 22, and 24, as seen in FIG. 4. The removable insulative cover 65 is positioned over the top of the beverage containers and the top surface 25 of the bottle and held in place in pocket 51 formed on the interior of cover 50. The pocket is accessed at opening 53 adjacent hinge 52. The cover 50 of the case is then closed and the user may either carry the cooler using the straps 60, 62 or position the cooler with the cans in an upright position with the cooler located at the waist of the user by extending the opposite straps about the user's waist and securing the buckle components 66 and 68.

Easy and convenient access is provided as the cooler can be accessed by removing the cooler from the user's waist and the case opened to provide access to the beverage containers which will have been maintained in a cooled condition by the chilled or frozen bottle 16. The design of the bottle, casing and bag components provide both a functional and attractive appearance. The shape of the bottle 16 which extends about a substantial portion of the periphery of the housed beverage containers will maintain the contents of the containers in a cold or cool condition for a long period of time. Heat loss is minimized by the insulative casing 14 and insulative panel 65. The foam casing 14 also provides cushioning against the body of the user and when carried in this fashion prevents any portion of the chilled or cold bottle from coming in direct contact with the body of the user. When it is necessary to clean the components of the cooler, they can be conveniently separated and removed as shown in FIG. 2 for washing or cleaning as required.

Figure 5:
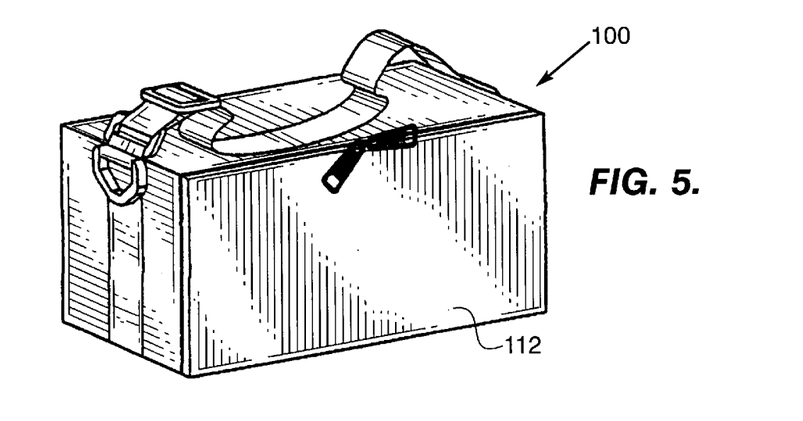
FIG. 5 is a perspective view of an alternate embodiment of a cooler according to the present invention.
Figure 6:
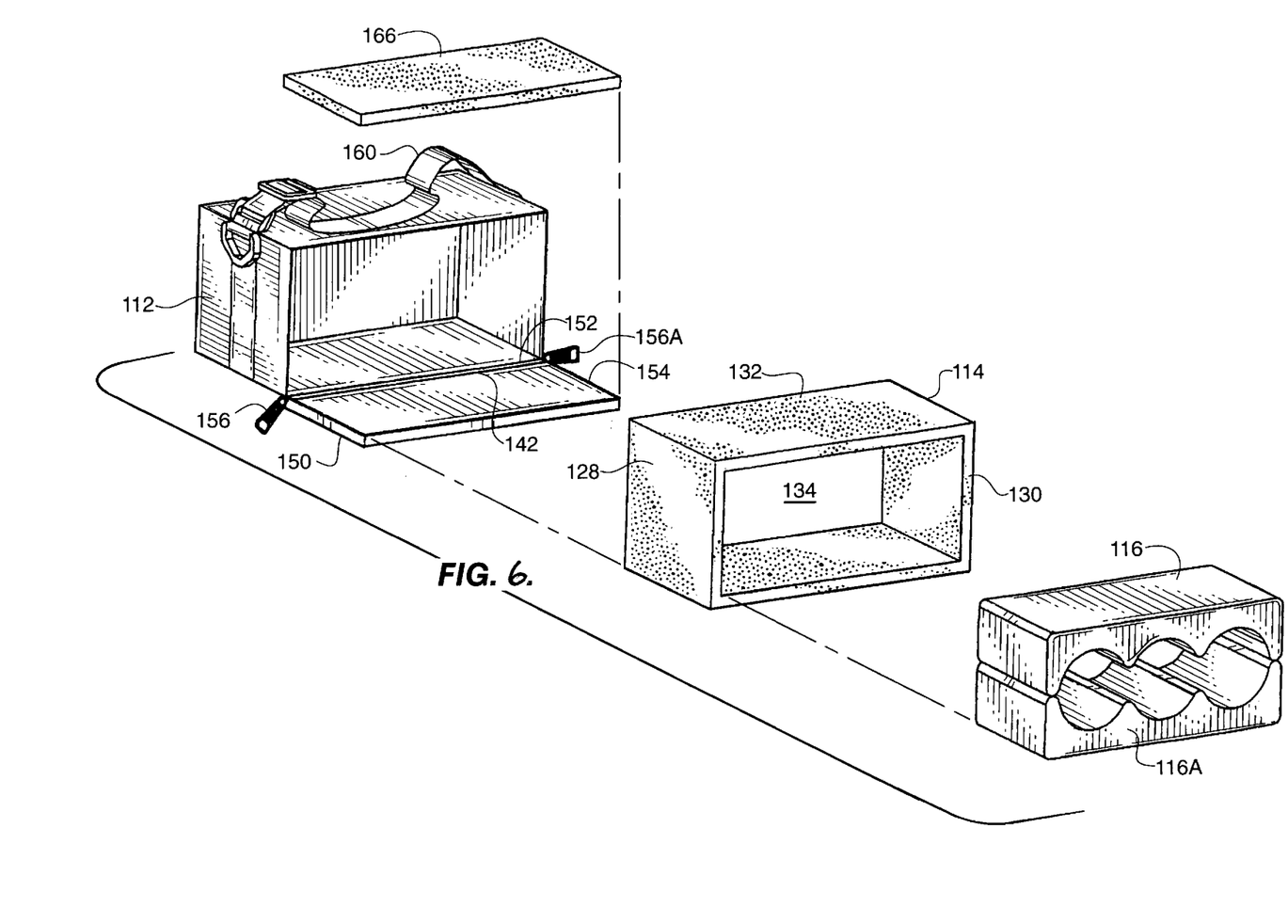
FIG. 6 is an exploded view of the cooler shown in FIG. 5.
Figure 7:
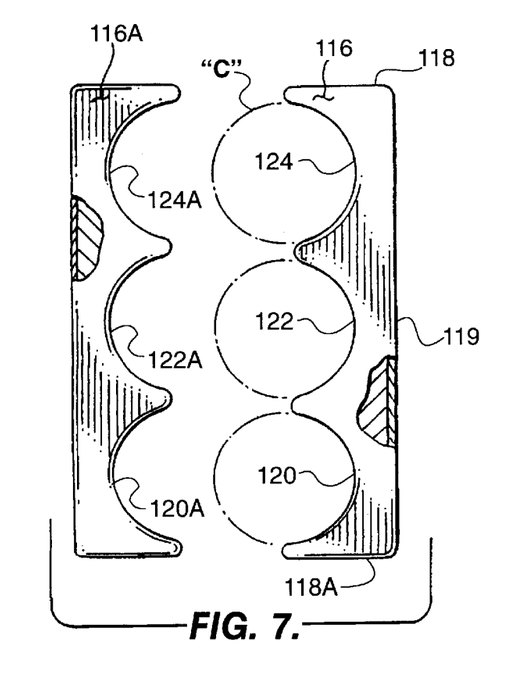
FIG. 7 is a front view showing a pair of bottles with beverage containers being shown in dotted lines.

Turning to FIGS. 5 to 7 an alternate embodiment of the cooler system of the present invention is shown which is generally designated by the numeral 100. The cooler of embodiment 100 as shown is adapted to cool and maintain in a cool condition a selected number of beverage containers such as three 12 oz. beverage cans or 10 oz. bottles or a combination of such beverage containers. The embodiment 100 consists of an exterior bag or case 112, an insulative casing or liner 114 and a pair of chillable or freezable bottles 116 and 116A. The design of this embodiment is compact and provides a construction in which the beverage containers to be cooled, which may consist of both cans or bottles, are substantially enclosed within the ice substitute bottles 116 and 116A.

The bottles 116 and 116A are hollow and formed by blow molding or other fabrication technique and each contains a suitable refrigerant such as water, water and glycerine or other fluids or materials which may be chilled or frozen to maintain a low temperature. Each of the bottles 116 and 116A has end walls 118 and 118A, outer wall 119 and opposite top and bottom surfaces 125 and 126. Walls 118 and 119 are substantially planar. The inwardly disposed surface of each of the bottles defines a plurality of vertically extending semi-cylindrical recesses 120, 122 and 124. Similarly, bottle section 116A defines semi-cylindrical recesses 120A, 122A and 124A.

As best seen in FIG. 7, it will be seen when the bottle sections 116 and 116A are disposed in opposing relationship, a plurality of generally cylindrical cooling chambers are formed which are each sized to receive a beverage container such as a bottle or can "C". When the bottles 116 and 116A are chilled or the contents frozen, the exterior surfaces of a housed beverage container are substantially in complete contact with the bottles to achieve and maintain the maximum cooling effect. An advantage of this construction is that the bottle sections 116 and 116A are essentially identical and may be fabricated by the same tooling, thus achieving economy of manufacture. Further, the fact that the bottle sections 116 and 116A are separable facilitates cleaning and also allows for easy insertion and removal of beverage containers. Another advantage is that the bottles are nestable to conserve space when stored or placed in a freezer. The two bottles occupy about the same space as a single ice cube tray.

The coolant containing bottles 116 and 116A are inserted into an insulated casing 114. The casing is generally rectangular having end walls 128 and 130, side walls 132 and 134 and rear wall 135, which are made of a suitable insulative material such as cross-linked, expanded polyethylene foam having a density of 2 PCF. A separate rectangular panel 166 completes the insulated enclosure. The panel 166 is also made from a suitable material such as polyethylene and it is preferred that the bottom panel be made from a denser material for additional strength such as 4 PCF cross-link polyethylene foam. The insulative material is also preferably waterproof and is cleanable.

In use, the containers to be cooled are inserted between the refrigerated or chilled bottles 116 and 116A. The bottles 116 and 116A and beverage containers are inserted within the rectangular insulated casing 114. The panel 166 is placed within the pocket 142 of the exterior carrier bag 112.

The carrier bag 112 is fabricated from a suitable lightweight moisture resistant fabric material such as nylon or polyester and conforms to the shape of the insulation casing. A cover 150 is secured at a fabric hinge 152 to the carrier bag. The top or cover 150 may be closed by means of a peripherally extending zipper 154 having slide members 156 and 156A. One or more exterior surfaces of the carrier case may be provided with compartments or pouches for storage of additional items. A flexible strap 160 of nylon webbing or similar material extends between the opposite sides of the carrier bag and is secured thereto by stitching. It is noted that the cover 150 hinges at 152 at the bottom edge of the case so that it opens to a horizontal position as seen in FIG. 6. This provides convenient access to the contained beverage container when the cooler is placed on a horizontal surface such as a table top.

In other respects, the cooler shown in FIGS. 4 through 7 is similar to that described with respect to FIGS. 1 through 4. Beverage containers "C" to be cooled can be inserted between the sections of the frozen or chilled bottle and placed within the insulative housing which is then received within the exterior case. Access to the cooled beverage containers is achieved opening the top 150 by moving zipper slides 156 to an open position to allow the cover 150 and panel 166 to open.

The device can be easily stored and cleaned as the components are separable. The bottle components 116 and 116A may be stored in the refrigerator or freezer when not in use so they will be maintained in a frozen or chilled condition for use. The remaining components, namely the carrying case and insulation components 114 and 166 are lightweight and flexible and may be easily stored in a compact condition.

Figures 11, 13:
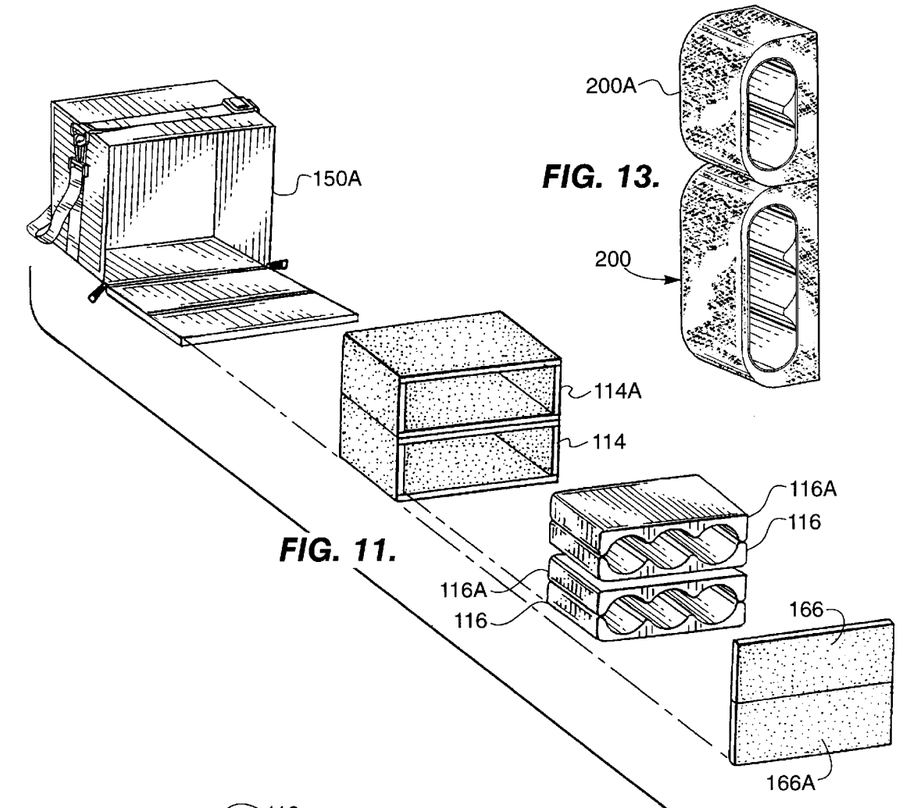
FIG. 11 is a perspective view showing an alternate embodiment similar to that shown in FIGS. 5 to 7 which alternate embodiment utilizes the same or similar components to achieve increased capacity.
FIG. 13 is a perspective view of the cooler showing the bottles of FIG. 12 assembled in a multiple bottle configuration for increased capacity.
Figure 12:
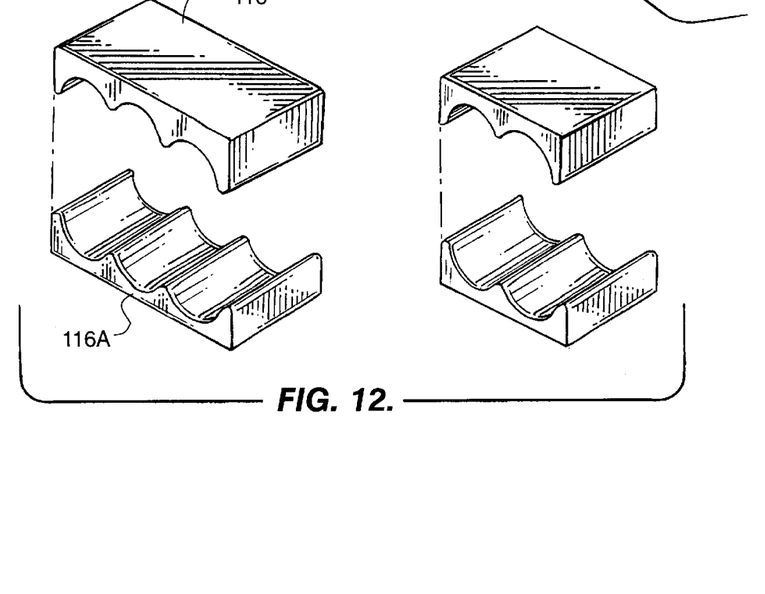
FIG. 12 is a perspective view showing bottles both as a pair of two and three compartment bottles.

As seen in FIG. 11, the cooler system allows the user to select components to achieve the desired capacity cooler. In FIG. 11, a plurality of pairs of bottles 116 and 116A have been arranged in a pair of insulating casings 114, 114A. Case 150A is dimensioned to accept the two pairs of bottles and will store up to 6 beverage containers. The modular design permits use of the same bottles and insulation casings 114, 114A, and panels 166 and 166A as used in the FIG. 5 to 7 embodiment. The user is provided exterior cases 150A in several sizes and the user may then assemble a cooler sized in accordance with the user's requirements. For example, the components can be easily assembled to accept 9 or 12 beverage containers and a larger exterior case is then used.

Figure 8:
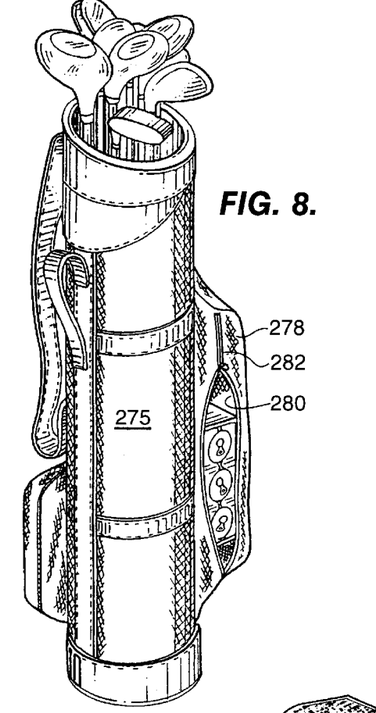
FIG. 8 is a perspective view of a golf bag having a pocket for receiving another embodiment of the cooler according to the present invention.
Figure 9:
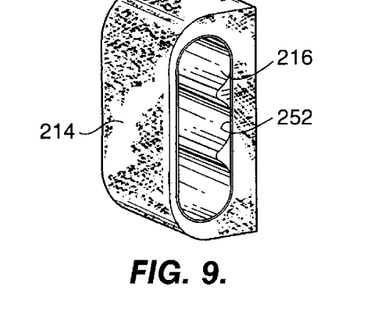
FIG. 9 is a perspective view of the cooler shown in FIG. 8.
Figure 10:
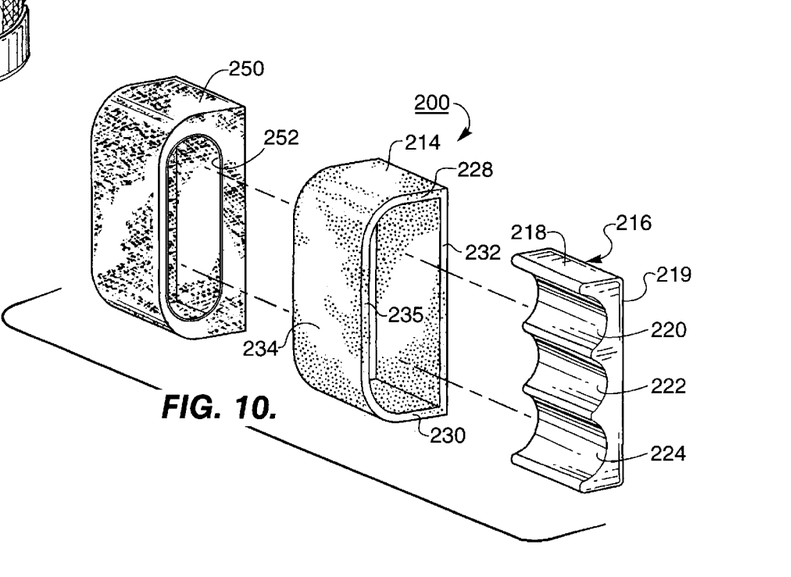
FIG. 10 is an exploded view of the cooler shown in FIGS. 8 and 9.

Another embodiment of the present invention is shown in FIGS. 8 through 10. This embodiment, generally designated by the numeral 200, is designed for convenient access when the cooler 200 is to be inserted or carried in another article such as a knapsack, golf bag, saddlebag or the like. The cooler 200 is provided with bottle 216 which is identical and contains a suitable refrigerant or coolant. Bottle 216 has a generally planar rear surface 219, opposite ends 218, and an interior surface which defines a plurality of semi-cylindrical concavities or recesses 220, 222 and 224. The bottle 216 is insertable within a compartment within the insulative casing 214. The insulative casing 214 is generally rectangular having opposite side walls 232 and 234 and end walls 228 and 230 and is constructed of a suitable material such as a cross-linked, polyethylene expanded foam. The casing 214 may be provided with a rear wall 235. The front of the casing is open for convenient insertion of the bottle 216 and the housed beverage containers.

The insulative casing 214, coolant containing bottle 216 and beverage containers are secured together by an exterior fabric cover 250 which extends over the bottles. The cover 250 has an opening 252 which registers with the beverage compartments 220, 222 and 224. The opening may be elasticized or have an elastic band about its periphery. The cover is elasticized so that it stretches to facilitate its placement about the bottles and insulative cover and will maintain the components together as best seen in FIG. 9.

In FIG. 8, the cooler is shown inserted in another article which in this case is shown as a golf bag 275 of conventional construction having a large side pocket 278 with an opening 280 which may be enclosed by means of a zipper 282 once the containers are in the position shown.

The cooler of this embodiment is adapted to be carried in the pocket of another article, such as a golf bag or the like. The cooler and beverage containers are preferably positioned in use as shown in FIG. 8 so that convenient access to the beverage containers is provided.

In FIG. 13, a plurality of individual coolers 200, 200A are shown vertically stacked. The coolers 200, 200A are as described in detail with respect to FIG. 10. In this position, a user may insert several such coolers into a space, the number and size of the cooler being selected in accordance with available space.

As will be seen from the foregoing, the present invention provides a unique cooler having specially designed bottles with an ice substitute, an insulating foam casing and in some instances a carrying case. The components are intended to facilitate efficient fabrication and permit easy separation for cleaning. The design is compact and will maintain contained beverages cooled for a extended periods of time in even the severest climatic conditions.

The modular system of the present invention provides a number of independent components which can be easily removed from the system. This versatile feature not only allows for cleaning and convenient storage, but these components can be purchased separately to allow the user to combine the components to achieve the desired capacity. All that is required is the appropriate number of bottles, insulating covers and carrying case of the necessary size. The modular system allows the user to customize a cooler having the necessary capacity by selecting the appropriate components. For example, the system of FIG. 6 and FIG. 11 both utilize the same bottles and insulative components. The only difference is the site of the outer case. Thus, by having outer cases of different sizes, the user is provided great flexibility in cooler selection appropriate for the needs of the user.

It will be seen from the foregoing while the present invention has been described with respect to several preferred embodiments thereof, those skilled in the art may make various modifications, alterations and changes. To the extent these various alterations, changes and modifications do not depart from the spirit and scope of the appended claims, they are intended to be encompassed therein.

I claim:

1. A beverage cooler for maintaining beverage containers having a height in a cooled condition comprising:
    (a) a bottle having a housing with an outer wall and an inner wall and containing a coolant, said inner wall defining a plurality of side-by-side generally cylindrical recesses for nestably receiving beverage containers, said recesses having a height less than the said height of said beverage container;
    (b) an insulative casing defining a compartment configured to receive said bottle and contain beverage containers; and
    (c) means for retaining said insulative casing about said bottle.

2. The beverage cooler of claim 1 wherein said bottle is formed from a plastic material.

3. The beverage cooler of claim 1 wherein said casing comprises an expanded polyethylene.

4. The beverage cooler of claim 1 wherein said means for retaining said insulation about said bottles comprises a soft side carrying case.

5. The beverage cooler of claim 4 wherein said case is a fabric having a body and a hinged cover with closure means selectively securing said cover to said case body and wherein said cover defines an interior pocket with an insulative panel removably receivable therein.

6. The beverage cooler of claim 5 wherein said case is provided with exterior article-receiving pockets.

7. A beverage cooler for maintaining beverage containers having a predetermined height in a cooled condition comprising:
    (a) an outer case having a generally rectangular body with side walls, a rear wall, opposite top and bottom walls, and a front cover hinged to said bottom wall with closure means, said covering having an open position extending from said bottom wall, said cover defining an interior pocket;
    (b) at least two bottles disposed in said case with said bottles defining a plurality of generally cylindrical compartments for nestably receiving said beverage containers in a generally horizontal position when said case is normally positioned on a horizontal surface;
    (c) insulation extending about the bottles adjacent the side walls, rear wall, and top and bottom walls of the case; and
    (d) an insulation panel removably disposed in said pocket.

8. The beverage cooler of claim 7 wherein said compartments have a height dimension less than said predetermined height.

9. A modular beverage cooler system for maintaining beverage containers of the type having a generally cylindrical body in a cooled condition, said modular cooler system comprising:

(a) a plurality of similarly sized bottles each having a planar outer wall, and opposite side walls, said bottles each containing a coolant, said inner walls defining a plurality of recesses which when said bottles are positioned facing one another in a paired arrangement, define a plurality of compartments for nestably receiving beverage containers;

(b) at least first and second outer cases each having a generally rectangular body with side walls, a rear wall, opposite top and bottom walls and a front cover hinged to said bottom wall, said cover defining an interior pocket, said first case being sized to receive one pair of bottles and said second case being sized to receive multiple pairs of bottles in a stacked arrangement;

(c) a removable generally rectangular insulation case having a predetermined cross section and having side walls, a rear wall, opposite top and bottom walls sized to snugly receive said paired arrangement of bottles and positionable in said case; and (d) a plurality of insulative panels generally sized to correspond to the cross-sectional configuration of said insulation case whereby the user may assemble a cooler of the desired size using selected components (a), (b) and (c) above.

10. The beverage cooler system of claim 9 wherein said cases are provided with exterior article-receiving pockets.

* * * * *